(No Model.)
I. L. ROBERTS.
PROCESS OF AND APPARATUS FOR MAKING METALLIC CARBIDS.
No. 587,509. Patented Aug. 3, 1897.
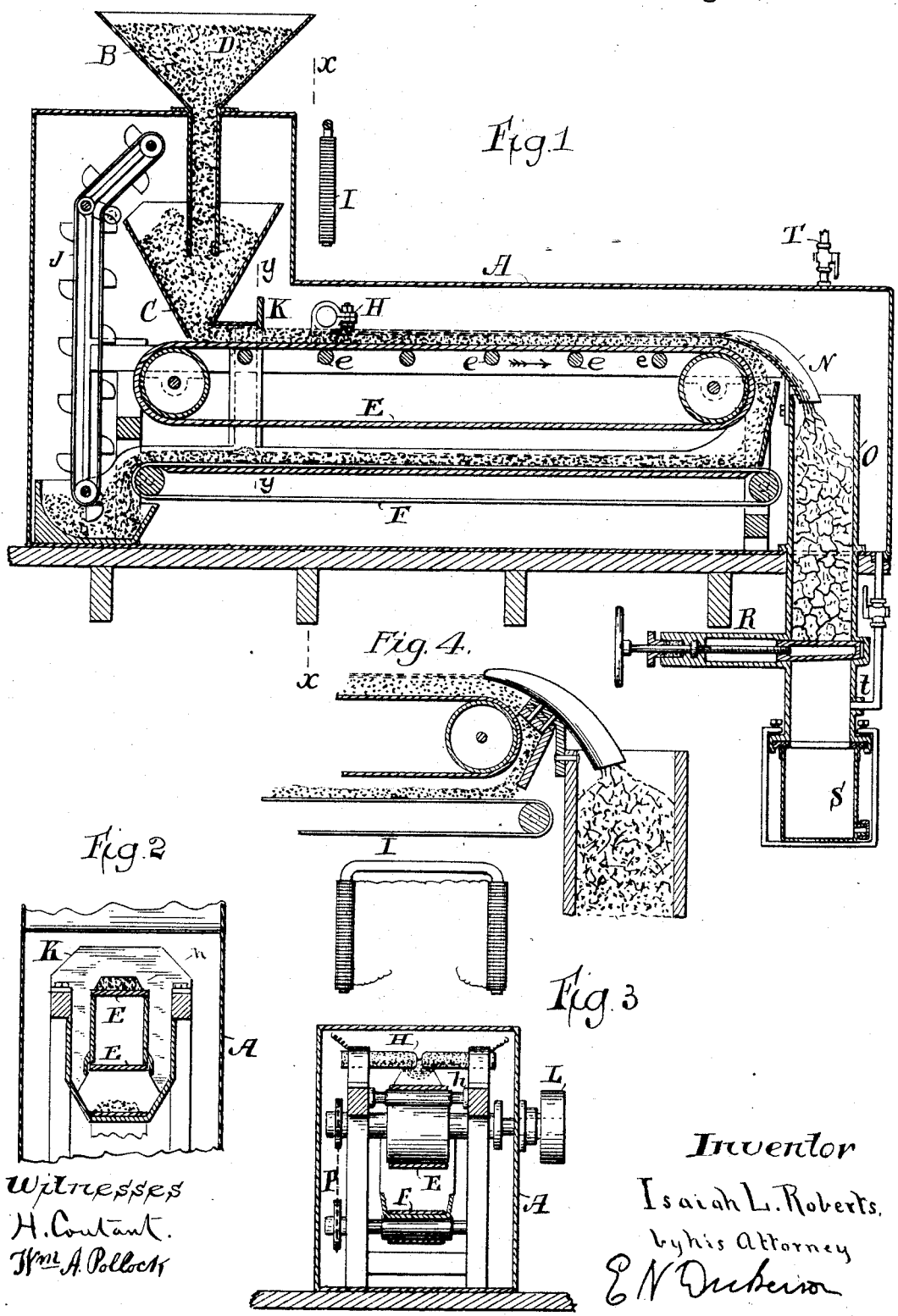

UNITED STATES PATENT OFFICE.

ISAIAH L. ROBERTS, OF BROOKLYN, NEW YORK.

PROCESS OF AND APPARATUS FOR MAKING METALLIC CARBIDS.

SPECIFICATION forming part of Letters Patent No. 587,509, dated August 3, 1897.

Application filed June 20, 1896. Serial No. 596,263. (No model.)

*To all whom it may concern:*

Be it known that I, ISAIAH L. ROBERTS, of the city of Brooklyn, county of Kings, and State of New York, have invented a new and useful Improvement in Processes of and Appaatus for Making Metallic Carbids, of which the following is a full, true, and exact description, reference being had to the accompanying drawings.

Heretofore carbids have been obtained by causing an electric arc to be formed in a mass of a suitable mixture of oxid and carbon and afterward stopping the current and removing the carbid thus formed by the heat of the said arc. This process is slow and wasteful of energy.

By my method, hereinafter described, I also make use of the electric arc; but my method is rapid and less wasteful of the energy, and this result is obtained by the use of a magnetically-deflected arc, combined with suitable mechanical devices, which are fully set forth in the following specification and shown in the annexed drawings, in which said drawings like letters of reference refer to like parts in all the figures.

My invention will be readily understood from the accompanying drawings, in which—

Figure 1 is a longitudinal cross-section of my apparatus. Fig. 2 is a cross-section through Y Y, and Fig. 3 is a cross-section through $x$ $x$, of the same. Fig. 4 is a separate view of the separator.

In the figures, A represents a metallic casing, B an outer chute, and C an inner chute; D, a mixture of oxid and carbon. Endless belts are shown at E and F. Two carbons are shown in position for producing an electric arc at H. An electromagnet is shown at I and an endless-chain conveyer at J, and a scraper at K.

To operate this apparatus and process I make a mixture of pulverized oxid and carbon in the proper proportion to form carbid and fill up the chute B with it, as shown at D. This mixture will partly fill the second chute C. I next set the driving-pulley L in motion, which will move the endless belt E, and F will be moved by the chain belt P. As the chute C is placed so that its opening is directly over the endless belt E, and said opening being less in width than said belt, the mixture above mentioned will rest thereon, and as the motion of the said belt is in the direction of the arrow the mixture will be carried forward toward the scraper K, which is scalloped out in such a manner as to form a continuous ridge or mass of the mixture, as shown at $h$. When this mass passes under the carbons H, I cause an electric arc to be formed at the point shown. The carbons should not touch the oxid mixture. At the same time the arc is formed the electromagnet I is energized as thoroughly as is necessary to cause the flame of the arc to be projected downward into the oxid mixture, which will heat it hot enough to form carbid on the surface of the bed or ridge of the mixture $h$. The flakes or scales of the carbid will be scooped off of the mass on the thin blade-like scoop N and dropped into the tube O and onto the gate-valve, from whence it is dropped from time to time by opening the said valve into the receptacle S, which when full can be removed, the gate-valve being previously closed to prevent air from entering. The mixture which is not converted into carbid falls onto the lower belt F and is carried back to the endless-chain carrier J, which elevates it to the chute C, from whence it is again carried toward the scraper and to the arc.

I prefer to carry on the whole operation in a non-oxidizing atmosphere in a closed chamber. I therefore inclose the whole with an air-tight casing A, which completely incloses it except where the chute B enters. The chute C should at all times have enough of the mixture in it to make a seal from the air.

In the production of carbids from oxids carbonic oxid and hydrogen and other gases are formed, which may be utilized by leading them out at the pipes T or $t$. These will soon fill up the chamber on starting; but I prefer to fill the chamber with a gas containing so little oxygen previously that an explosion is not possible.

In constructing the metallic casing no magnetic metal should be used near enough to the arc to injuriously influence the same. I prefer to make the belts of asbestos cloth and support the upper one E by rollers $e$ $e$ $e$ $e$.

It is obvious that in practice the carbon poles H will be made adjustable, either by the well-known automatic feeding mechanism or by hand by rods extending without the casing.

What I claim as my invention, and desire to secure by Letters Patent, is—

1. The process of continuously forming metallic carbids, which consists in moving beneath a horizontal electric arc and in direct contact therewith the metallic compound and carbon to be converted, and in continuously removing the converted compound, substantially as described.

2. The process of continuously forming metallic carbids, which consists in moving beneath a horizontal electric arc the metallic compound and carbon to be converted, and in deflecting said arc downward, substantially as described.

3. The process of continuously forming metallic carbids, which consists in moving beneath a horizontal electric arc the metallic compound and carbon to be converted, and in deflecting said arc downward by means of a magnet, substantially as described.

4. The process of continuously forming metallic carbids, which consists in moving beneath a horizontal electric arc the metallic compound and carbon to be converted, and in deflecting said arc downward by means of an electromagnet, substantially as described.

5. The process of continuously forming metallic carbids, which consists in moving beneath a horizontal electric arc the metallic compound and carbon to be converted, which is maintained in contact with said arc in a non-oxidizing atmosphere, substantially as described.

6. The process of continuously forming metallic carbids, which consists in moving beneath a horizontal electric arc the metallic compound and carbon to be converted, in a non-oxidizing atmosphere, and in deflecting said arc downward, substantially as described.

7. The process of continuously forming metallic carbids, which consists in moving beneath a horizontal electric arc the metallic compound and carbon to be converted, in a non-oxidizing atmosphere, and in deflecting said arc downward by means of a magnet, substantially as described.

8. The process of continuously forming metallic carbids, which consists in moving beneath a horizontal electric arc the metallic compound and carbon to be converted, in a non-oxidizing atmosphere, and in deflecting said arc downward by means of an electromagnet, substantially as described.

9. The process of continuously forming metallic carbids, which consists in continuously moving in contiguity to an electric arc the metallic compound and carbon to be converted, and separating the formed carbid from the uncombined surrounding material by means of the motion of the carbid and uncombined material, substantially as described.

10. The process of continuously forming metallic carbids, which consists in moving the metallic compound and carbon in close proximity to and continuously past an electric arc, and in deflecting said arc toward the compound, substantially as described.

11. The process of continuously forming metallic carbids, which consists in moving the metallic compound and carbon in close proximity to and continuously past an electric arc, and in deflecting said arc toward the compound by means of a magnet, substantially as described.

12. The combination, in an electric furnace, of a traveling conveyer constructed and arranged to support a body of comminuted material and to move it beneath an electric arc, and electrodes in a position to produce a horizontal arc in contact with said material, whereby the mixed material is changed, substantially as described.

13. The combination in an electric furnace, of a traveling conveyer for moving a body of the material to be converted beneath an electric arc, electrodes in a position to produce a horizontal arc, whereby the mixed material is changed, and a separator for separating the changed from the unchanged material, substantially as described.

14. The combination in an electric furnace, of a traveling conveyer for moving a body of the material to be converted beneath an electric arc, electrodes in a position to produce a horizontal arc, whereby the mixed material is changed, a separator for separating the changed from the unchanged material, and a conveyer for returning the unchanged material to the belt, substantially as described.

15. The combination in an electric furnace, of a traveling conveyer for moving a body of the material to be converted beneath an electric arc, electrodes in a position to produce a horizontal arc, and an electromagnet for deflecting said electric arc, whereby the mixed material is changed, substantially as described.

16. The combination in an electric furnace, of a traveling conveyer for moving a body of the material to be converted beneath an electric arc, electrodes in a position to produce a horizontal arc, an electromagnet for deflecting said electric arc, whereby the mixed material is changed, and a separator for separating the changed from the unchanged material, substantially as described.

17. The combination in an electric furnace, of a traveling conveyer for moving a body of the material to be converted beneath an electric arc, electrodes in a position to produce a horizontal arc, an electromagnet for deflecting said electric arc, whereby the mixed material is changed, a separator for separating the changed from the unchanged material, and a conveyer for returning the unchanged material to the belt, substantially as described.

18. The combination in an electric furnace, of a feed for feeding mingled material upon a traveling belt, a traveling belt for moving the material toward an electric arc, a shaper for shaping the material upon the belt, mechanism for causing an electric arc to operate upon said material, and separating mechanism for separating the material changed by the electric arc from the material fed to the belt, substantially as described.

In testimony whereof I have signed my name to this specification in the presence of two subscribing witnesses.

ISAIAH L. ROBERTS.

Witnesses:
   H. COUTANT,
   W. LAIRD GOLDSBOROUGH.